J. GREAVES,
Assignor of one-half to J. & J. DOBSON.
CONDENSING CYLINDER FOR CARDING ENGINES.
No. 10,054. Reissued Mar. 7, 1882.
FIG. I.
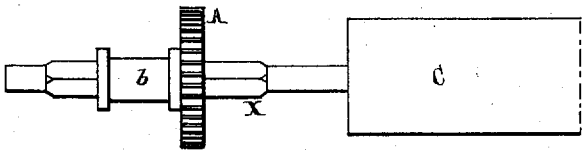
FIG. II.
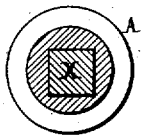
Witnesses.
Albert E. Zachariah
George H. Sonneborn Jr.
Inventor.
James Greaves
per George E. Buckley
atty.
N. PETERS. Photo-Lithographer. Washington. D. C.

UNITED STATES PATENT OFFICE.

JAMES GREAVES, OF PHILADELPHIA, PENNSYLVANIA, ASSIGNOR OF ONE-HALF TO JOHN DOBSON AND JAMES DOBSON, OF SAME PLACE.

CONDENSING-CYLINDER FOR CARDING-ENGINES.

SPECIFICATION forming part of Reissued Letters Patent No. 10,054, dated March 7, 1882.

Original No. 187,620, dated February 20, 1877. Application for reissue filed March 24, 1877.

DIVISION A.

*To all whom it may concern:*

Be it known that I, JAMES GREAVES, of Philadelphia, State of Pennsylvania, have made certain new and useful Improvements in Condensing-Cylinders for Carding-Engines; and I do hereby declare the following to be a full, clear, and exact description of the same, reference being had to the annexed drawings, making part hereof.

The nature of my invention is as follows, viz:

My invention consists, in a carding-engine, of a condensing or rubber cylinder mounted upon a polygonally-shaped horizontal shaft, in combination with a driving-gear having a sleeve-shaped bearing, said shaft or cylinder being adapted to be revolved by the said driving-gear, and at the same time to be rapidly and continuously reciprocated by suitable mechanism, substantially as and for the purposes hereinafter set forth.

This invention relates to condensing carding-engines which have a reciprocating motion imparted to the rubbers. The shaft or spindle is horizontal, and in addition to the work it has to perform it is required by its position to sustain its own weight upon its sides, which alone tends to wear them. Some difference will of course result from the dirty or cleanly character of the work done by the carding-engine, but nine months is the average extreme limit of the use of ordinary round feathered spindles. The wear of these shafts or spindles causes the reciprocating rubbers of the card to be untrue with respect to each other, thus occasioning the ruin of the work done by them and frequent breakage of that part of the apparatus.

The object of my invention is to overcome these difficulties and objections by making a more durable shaft or spindle, which I accomplish by making the spindle or shaft of such polygonal form, dispensing with a feather, as to distribute the wear occasioned by having to sustain its own weight and the work it has to do evenly over several parts of its sides or surface. I have found after several years' use that my shafts or spindles so constructed are very little worn, and have faithfully and continuously worked during all that period.

On all kinds of work the adoption of my improved spindles has resulted in a saving of from twenty-five to fifty-four dollars per year upon each carding-engine to which they have been applied.

The shaft or spindle of a condensing or rubbing cylinder for carding-engines consists ordinarily of a light shaft or bar, to which the cylinder of tinned plate is soldered or otherwise secured. This bar, being turned by a pinion at one end, turns the rubber at its other end, thus forming a horizontal connecting-shaft, commonly called a "spindle." The rubber has a rapid reciprocating motion at the same time that it is revolving rapidly upon its axis.

In the drawings, Figure 1 shows a side view of my polygonal shaft or spindle, (square,) showing also a part of the rubber and the pinion in which the shaft or spindle reciprocates. Fig. 2 is a cross-section of the shaft or spindle in the bearing in which it reciprocates.

A is the pinion which turns the shaft or spindle X, and in the center *b* of which the latter reciprocates. C is the reciprocating rubber. The square shaft X is adapted to a square hole in the hub of the driving-wheel or pinion A, which wheel or pinion drives the shaft or spindle. The delay and trouble of removing the shafts or spindles when worn out are a source of much annoyance and expense, as the detaching of the tin cylinders and securing them to new spindles require tedious manipulation. I make that part of the spindle which reciprocates upon or in its bearing of a polygonal shape in cross-section rather than to make it round, as by the former shape the wear is evenly distributed to the corners of the polygonal sides. When the shaft or spindle is square or polygonal, its bearing, in which it reciprocates, must of course be of corresponding shape.

I am well aware that an upright square spindle has been used in spinning-frames, as in English Patent No. 2,885 of 1856; also, that in cloth-cutting apparatus a triangular shaft, extendible lengthwise in its bearings, has been used. These I do not claim; but,

Having thus described my invention, what I claim as new, and desire to secure by Letters Patent, is—

In a carding-engine, a condensing or rubber cylinder mounted on a polygonally-shaped horizontal shaft, in combination with a driving-gear, A, having a sleeve-shaped bearing, *b*, said shaft and cylinder being adapted to be revolved by the drive-wheel A, and at the same time to be rapidly and continuously reciprocated by suitable mechanism, substantially as and for the purposes described.

JAMES GREAVES.

Witnesses:

ALBERT E. ZACHERLE,
GEORGE H. SONNEBORN.